(12) United States Patent
Kaplan et al.

(10) Patent No.: US 9,743,643 B1
(45) Date of Patent: Aug. 29, 2017

(54) NETWORK-BASED REMOTE PET MONITORING DEVICE AND METHOD

(71) Applicants: Michael L. Kaplan, Greenwich, CT (US); Kris Backenstose, Point Reyes Station, CA (US)

(72) Inventors: Michael L. Kaplan, Greenwich, CT (US); Kris Backenstose, Point Reyes Station, CA (US)

( * ) Notice: Subject to any disclaimer, the term of this patent is extended or adjusted under 35 U.S.C. 154(b) by 0 days.

(21) Appl. No.: 15/233,887

(22) Filed: Aug. 10, 2016

(51) Int. Cl.
*G08B 23/00* (2006.01)
*A01K 11/00* (2006.01)
*A01K 29/00* (2006.01)
*A01K 27/00* (2006.01)

(52) U.S. Cl.
CPC .......... *A01K 11/008* (2013.01); *A01K 27/009* (2013.01); *A01K 29/005* (2013.01)

(58) Field of Classification Search
CPC ... A01K 11/008; A01K 27/009; A01K 29/005
See application file for complete search history.

(56) References Cited

U.S. PATENT DOCUMENTS

| | | | |
|---|---|---|---|
| 5,241,923 A | 9/1993 | Janning | |
| 5,900,818 A | 5/1999 | Lemnell | |
| 6,067,018 A | 5/2000 | Skelton et al. | |
| 6,874,447 B1 | 4/2005 | Kobett | |
| 7,411,492 B2 | 8/2008 | Greenberg | |
| 7,616,124 B2 | 11/2009 | Paessel et al. | |
| 8,438,999 B2 | 5/2013 | Hardi et al. | |
| 9,284,773 B1* | 3/2016 | Fridley | E06B 7/32 |
| 2002/0021219 A1 | 2/2002 | Edwards | |
| 2006/0011144 A1* | 1/2006 | Kates | A01K 15/02 119/719 |
| 2007/0204804 A1 | 9/2007 | Swanson et al. | |
| 2008/0314335 A1 | 12/2008 | Kates | |

(Continued)

OTHER PUBLICATIONS

Website: http://puppytweet.com/ Downloaded Jul. 15, 2014 Puppy Tweets™ is the electronic dog tag that sends messages to your home computer, then Tweets to you! PuppyTweets™ is a tag with a sound and motion sensor that you attach to your pet's dog collar and connect its USB receiver to your computer.

(Continued)

*Primary Examiner* — Erin File
(74) *Attorney, Agent, or Firm* — Russ Weinzimmer & Associates, PC (57) ABSTRACT

A pet monitoring device is disclosed that's wearable by a pet for recording and communicating the pet's movements within an environment in which radio frequency identifier (RFID) tags have been strategically placed. The device includes: a transmitter configured to send a radio signal to an area surrounding a pet's location; a receiver configured to receive a reflected radio signal from an RFID tag within the area; a processor configured to identify the RFID tag of the reflected radio signal; and a database in which the processor stores times and locations of identified RFID tags in the environment such that the times and locations are indicative of behavior of the pet in the environment. The device can be used for behavioral analysis, tracking key indicators related to the well-being of the pet, such as when a pet eats and drinks water, and how the pet behaves during recovery from an injury.

20 Claims, 10 Drawing Sheets

(56) References Cited

U.S. PATENT DOCUMENTS

| | | |
|---|---|---|
| 2010/0289639 A1 | 11/2010 | Gibson |
| 2011/0196651 A1 | 8/2011 | Delin et al. |
| 2012/0006282 A1 | 1/2012 | Kates |
| 2012/0204811 A1 | 8/2012 | Ryan |
| 2013/0186962 A1 | 7/2013 | Kennett et al. |
| 2013/0217332 A1 | 8/2013 | Altman et al. |
| 2016/0015005 A1* | 1/2016 | Brown, Jr. ........... A01K 29/005 340/573.3 |
| 2016/0192615 A1* | 7/2016 | Parness ................. A01K 1/034 119/454 |

OTHER PUBLICATIONS

Website: http://www.rockethub.com/projects/40658-techydogs-collar Downloaded Jul. 15, 2014 TechyDogs Collar Project for Dog Lovers The collar uses sensors to continuously monitor your dog's activity. It also tracks your dog's location.

Website: http://www.ecouterre.com/wearable-tech-market-for-pets-expected-to-reach-2-6-billion-by-2025/ Downloaded Jul. 16, 2014 Wearable-Tech Market for Pets Humans aren't the only ones that can wear activity trackers. In fact they're now being made for Fido and the market for wearable tech for pets and animals is set to explode.

\* cited by examiner

NETWORK-BASED REMOTE PET MONITORING DEVICE AND METHOD

FIELD OF THE INVENTION

The present invention relates generally to pets, and more particularly to remotely monitoring the activities of pets.

BACKGROUND OF THE INVENTION

Pets are often left alone for long periods of time due to people needing to leave the home for work, shopping, and enjoying life outside the home. Often, pets are left at home alone with no one to take care of them or monitor their actions. If a pet gets loose and runs loose outside, the owner will not discover this until their return to the home. Likewise, if a pet has a medical problem, or destroys some property in the home while left unsupervised, there is no way that an absent pet owner can know of this problem until he or she returns home and witnesses the situation personally.

SUMMARY OF THE INVENTION

The present invention provides an intelligent pet collar having a processing system that collects and transmits data on a pet's movements and conditions to a pet owner or pet care professional. The intelligent collar records the actions of an animal when encountering RFID tags placed throughout an environment and transmits messages to the pet owner or caregiver through a communication network. Placement of RFID tags is may include in front of a webcam, on a sofa, near the pet owner's bed, front door, pet door, food or water bowl or play area. When a pet comes within proximity of an RFID tag, the time and duration of the pet's proximity to the RFID tag is recorded by the intelligent collar and transmitted to the pet owner over a communication network such as the Internet. The pet owner can receive messages from the pet collar over an interface operating on a computing device, and program triggers for generating messages and review logs to perform behavior analysis and interpretation of pet's activities. The collar can be used by veterinarians, pet breeders, and pet walkers for behavioral analysis, tracking key indicators related to the well-being of the pet. Knowing when an ill pet is drinking water and how the pet behaves during recovery is essential information for care providers. The pet collar can also be used to show how the pet reacts to a new environment.

A general aspect of the invention is a pet monitoring device wearable by a pet for recording and communicating the pet's movements within an environment in which radio frequency identifier (RFID) tags are placed. The pet monitoring device includes: a transmitter configured to send a radio signal to an area surrounding a pet's location; a receiver configured to receive a reflected radio signal from an RFID tag within the area; a processor configured to identify the RFID tag of the reflected radio signal; and a database in which the processor stores times and locations of identified RFID tags in the environment such that the times and locations are indicative of behavior of the pet in the environment.

In some embodiments, the processor is configured to enter a powermode sleep state.

In some embodiments, the device further includes: a removable storage medium in which the database can be stored. In further embodiments, the removable storage medium is contained inside the pet monitoring device behind an access door.

In some embodiments, the device further includes: a camera, and wherein the database is configured to store images captured by the camera.

In some embodiments, the device further includes: a microphone, and wherein the database is configured to store audio captured by the microphone. In further embodiments, the audio captured by the microphone is determined by the processor to be indicative of a pet in distress by comparing the captured audio to control samples stored in the database. In further embodiments, the audio captured by the microphone is determined by the processor to be a distress bark.

In some embodiments, the device further includes: a communication link configured to transmit portions of information stored in the database over a communication network to a remotely-located user. In further embodiments, the processor is configured to operate the communication link upon detection of a trigger condition.

In some embodiments, the device further includes a speaker, wherein the processor is configured to controllably transmit sounds via the speaker. In further embodiments, the sounds transmitted via the speaker include sound files received over the communication link from the communication network.

In some embodiments, the identified RFID tags are associated with locations within the environment. In further embodiments, the locations within the environment include a location in which a pet typically drinks water. In further embodiments, the locations within the environment include a location in which a pet typically rests. In further embodiments, the locations within the environment include a location where there is a one of either a door or a window.

Another general aspect of the invention is a method of monitoring a pet from a remote location. The method includes placing a pet monitoring device on a pet collar, the device being configured to detect individual radio frequency identifier (RFID) tags in an environment in which a plurality of RFID tags have been placed; generating a log entry when an RFID tag is detected, and updating the log entry when the RFID tag is no longer detected; comparing the log entry to at least one trigger condition; and sending a notification over a communication network to a remote user if the trigger condition is met.

In some embodiments, the method further includes: periodically transmitting a radio signal that is capable of reflection by an RFID tag in the environment, and sending a message over the communication network that no RFID tags have been detected for a period of time.

In some embodiments, the method further includes: including a microphone in the pet monitoring device; recording a control sample audio file captured by the microphone onto a storage medium in the pet monitoring device; associating a trigger condition with the recorded control sample audio file; capturing a subsequent audio file with the microphone; comparing the subsequent audio file with the control sample audio file; and sending a distress notification if the subsequent audio file is sufficiently similar to the control sample audio file. In further embodiments, the subsequent audio file is sufficiently similar to the control sample audio file if a threshold percentage of data points in both audio files are equivalent.

In some embodiments, the method further includes: activating at least one of the group of devices consisting of a camera, a microphone, and a motion detector, and capturing input from the activated device; comparing input from the activated device to a control sample; and sending an additional distress notification to a remote user over a communication network.

BRIEF DESCRIPTION OF THE DRAWINGS

Many additional features and advantages of the present invention will become apparent from reading the following detailed description when considered in conjunction with the accompanying figures.

DETAILED DESCRIPTION

Figure 1:
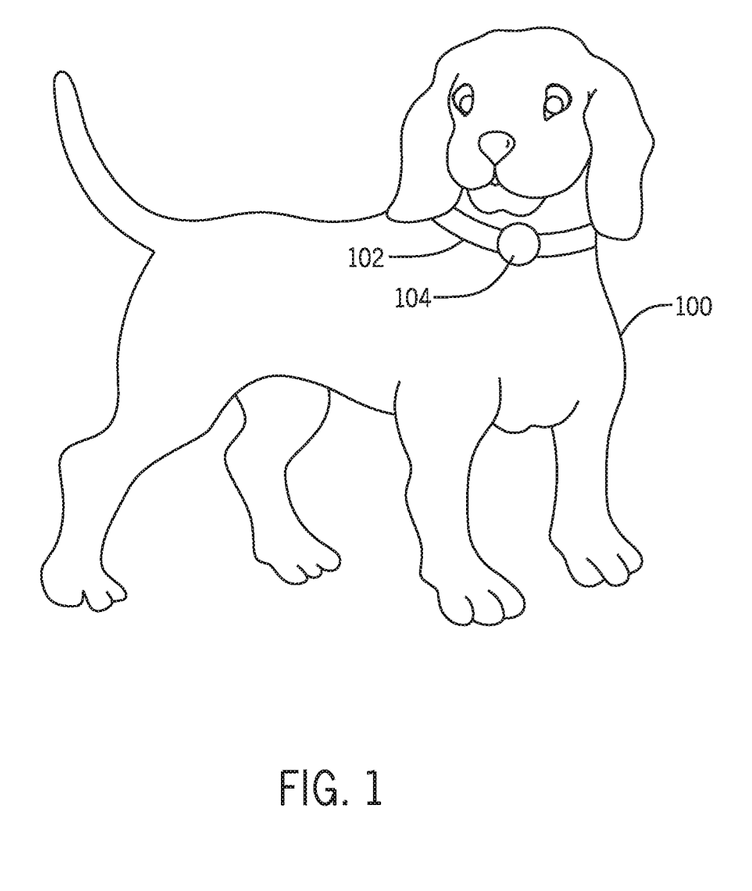
FIG. 1 is a front view of a pet wearing a collar having a system for detecting the presence of RFID tags, the system being fastened to the collar.

Referring to FIG. 1, a pet 100 is shown wearing a collar 102 having system 104 that periodically transmits radio frequency signals and receives signals reflected by radio frequency identifier (RFID) tags 108 placed throughout environment 106 (FIG. 2) that reflect the signals transmitted by system 104, and also add identifiers to the reflected signal that indicate when the pet 100 is near the various RFID tags 108 placed in environment 106. Over time, by examining which RFID tags were detected, at what time they were detected, and for how long they were detected, system 104 can characterize pet's 100 behavior, and generate a message that conveys to a remotely-located pet owner the pet's 100 condition and behavior.

Referring again to FIG. 2, the pet 100 is typically monitored in an environment 106. By placing RFID tag 108-1 near the pet's 100 bed 110, system 104 can determine when pet 100 is in its bed and for how long. Similarly, by placing RFID tag 108-2 near the pet's 100 water bowl 112, system 104 can determine when the pet 100 is near its water source and for how long, thus providing some indication of a pet's water consumption. RFID tags 108 can be placed elsewhere for useful data collection. For example RFID tag 108-3 near front door 114 can indicate when and for how long pet 100 approaches and remains near the front door of environment 106, for example if someone comes to front door 114 and rings a doorbell, delivers a package, or simply is the pet owner returning to environment 106. Similarly, RFID tag 108-4 can be placed near pet door 116, to monitor the pet's 100 trips to an outdoor area. Similarly, the placement of RFID tags 108 can provide triggering of additional devices such as camera 120, microphone 122, or speaker 124. Similarly, motion detectors 126 can be placed within environment 106, to activate devices 120, 122 and 124.

Figure 3A:
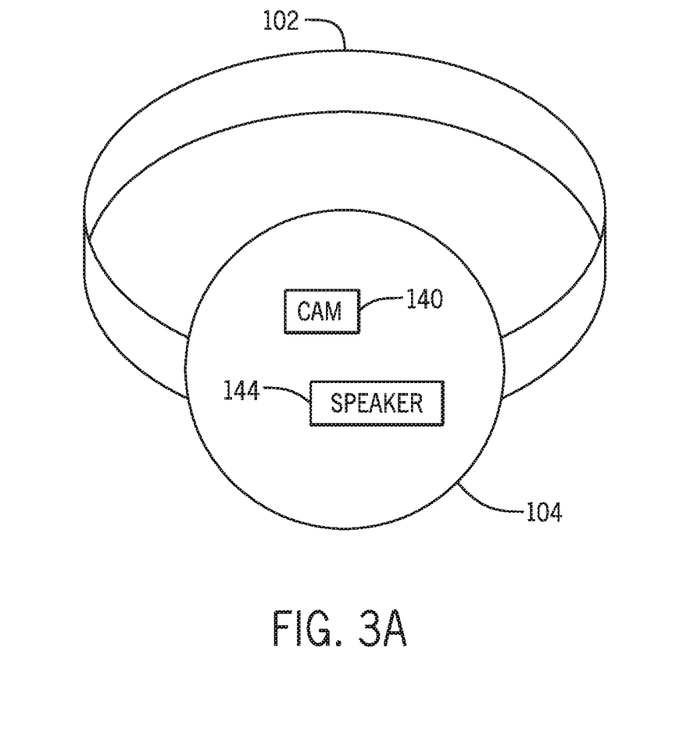
FIG. 3A is a block diagram of the system worn by the pet in FIG. 1, showing functional components of the system.
Figure 3B:
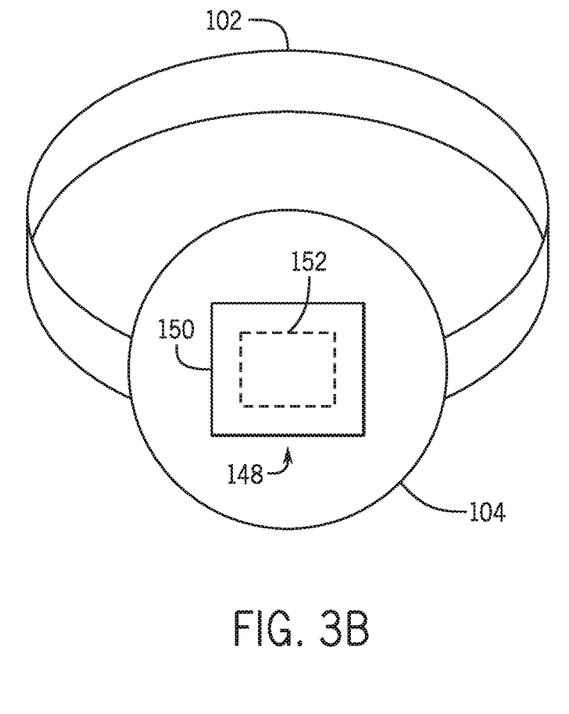
FIG. 3B is another block diagram of the system worn by the pet in FIG. 1, showing additional functional components.
Figure 4:
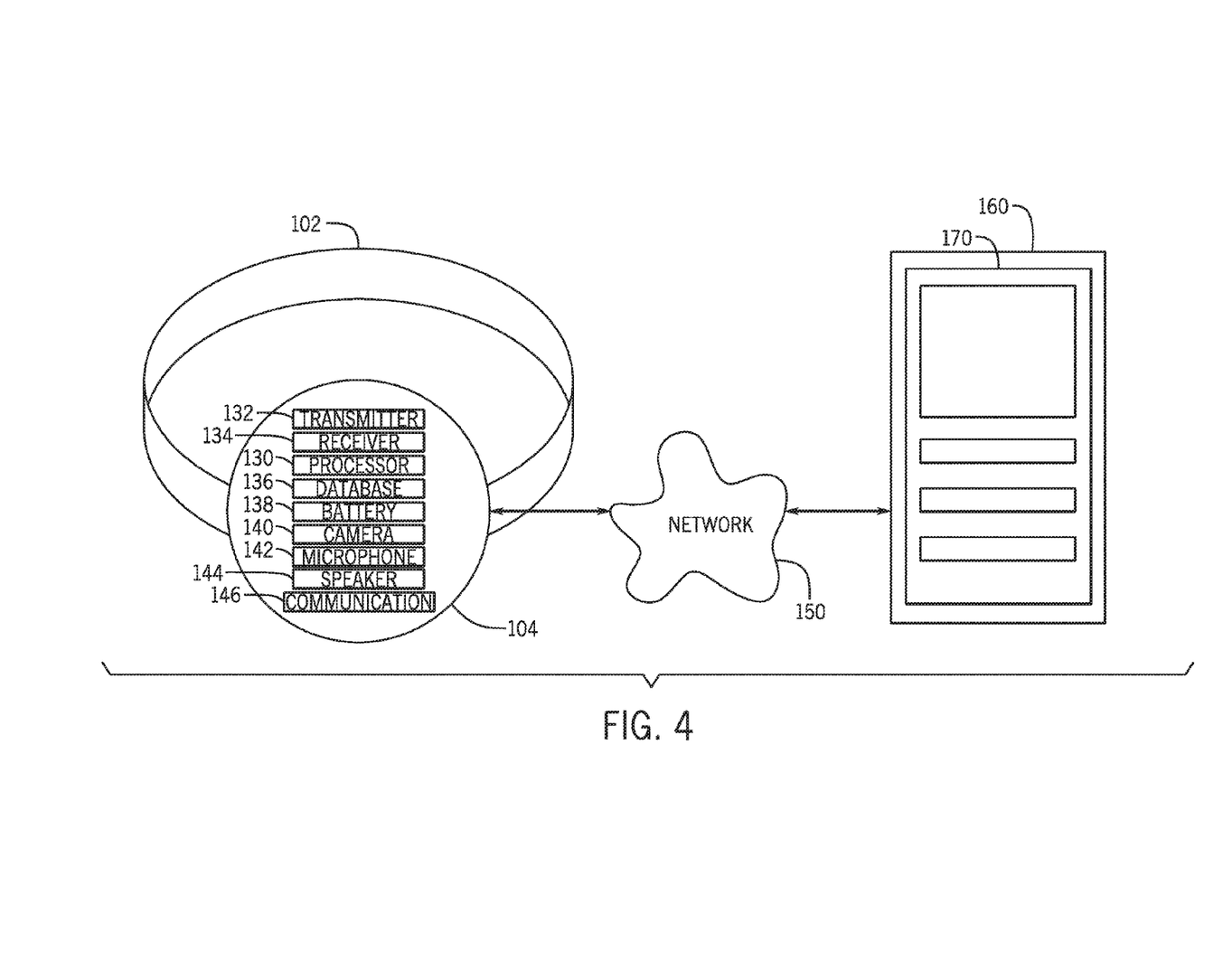
FIG. 4 is a block diagram showing the system worn by the pet in FIG. 1, the system being in communication over a communication network with a remote device.

FIGS. 3A and 3B show system 104. In an embodiment shown in FIG. 3A, system 104 includes camera 140, microphone 142, and speaker 144, which can be activated by system 104, either by triggers set by the pet owner, or by remote operation by the pet owner. FIG. 4 shows a logical view of system 104, and includes processor 130, radio transmitter 132, and receiver 134 configured to poll, detect, and store data in database 136. System 104 is powered by battery 138. In an embodiment, communications module 146 is included to facilitate transmission and receipt of communications between system 104 and a remotely-located pet owner in communication with system 104 over a communication network.

On the back side of system 104, shown in FIG. 3B, storage compartment 148 includes a removable door 150 that retains and protects removable storage medium 152 within system 104. Removable storage medium 152 stores database 136, readable by external devices such as computers, smart phones, and other devices that include a removable storage drive that is configured to accept removable storage medium 152. In an embodiment, removable storage medium 152 is a magnetic storage medium similar to those found in small consumer electronics, such as a secure digital (SD) card used in smart phones, cameras, and the like, which may contain as much as 128 GB of available storage space, suitable for storing database 136 as well as recorded video and audio from camera 140 and microphone 142 on system 104. SD cards are small, durable, and are widely used by a variety of devices and are the preferred embodiment of removable storage medium 152. Removable storage medium 152 is placed in the back side of system 104 to protect it from a dog that scratches itself, as well as moisture that a pet may encounter.

FIG. 4 also shows system 104 in communication with network 158 and a remotely-located user device 160. Network 158 is typically a public communication network, such as the Internet, and may include various cloud configurations of computers linked together to perform communication and software services to users. Device 160 is typically a mobile computing/communicating device carried by the pet owner, such as a smart phone, notebook computer, palmtop computer, laptop computer, and the like, that is capable of communicating over network 158 to other devices, such as system 104. Device 160 provides a user interface 170 to the pet owner, by which the pet owner receives messages from system 104, and interacts with system 104 and cameras 120 and 140, microphones 122 and 142, speakers 124 and 144, and motion detectors 126.

Figure 2:
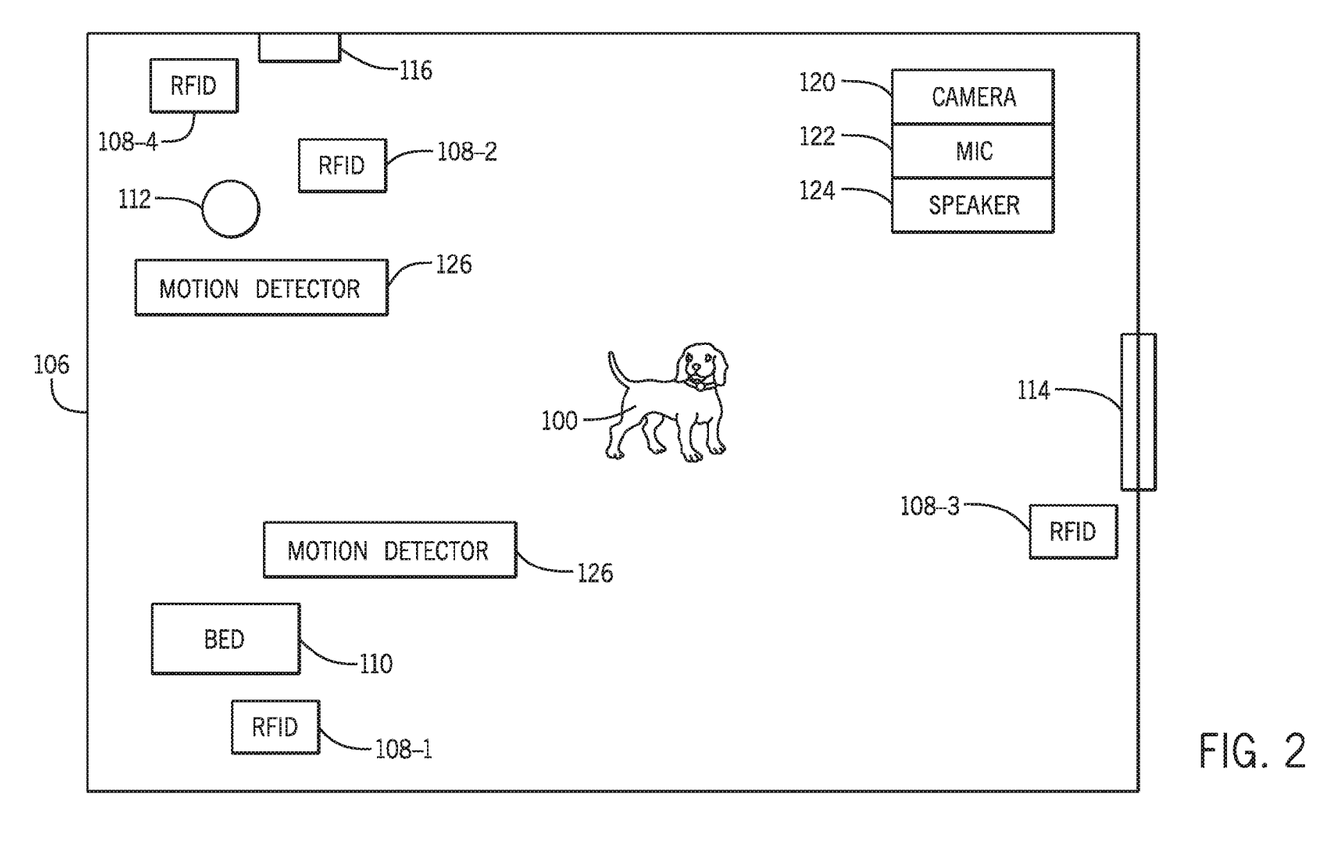
FIG. 2 is a top view of the pet shown in FIG. 1 in an environment having RFID tags placed at various locations of interest so as to detect pet movements to the locations.
Figure 5:
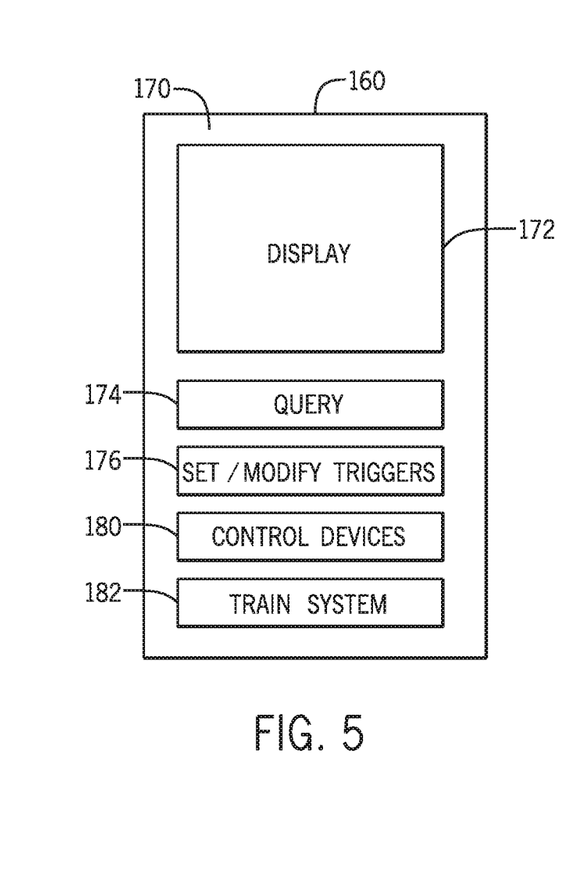
FIG. 5 is a screen layout of an exemplary main interface screen displayed on the remote user device shown in FIG. 4.

FIG. 5 is a depiction of user interface 170 as displayed to the pet owner on device 160. As shown, user interface 170 includes selectable options that allow a pet owner to control system 104 and obtain desired information regarding pet 100. Display 172 displays messages received from system 104. In an embodiment, display 172 controllably displays views from cameras 120 and 140. Query option 174 allows a pet owner to request information from system 104, such as "locate my pet," "generate status report," and the like. Set/modify triggers option 176 allows the pet owner to set event thresholds that triggers messages being generated and sent to the pet owner. Control devices option 180 allows the pet owner to operate cameras 120 and 140, microphones 122 and 142, speakers 124 and 144, and motion detectors 126 (FIG. 2). Train system option 182 allows the pet owner to classify data observed by system 104 and attach meaning to it. For example, when pet 100 exhibits a condition of stress, such as whining, or intense, prolonged barking, the pet owner can activate microphone 122 on system 104 to capture the sound and save it in database 136. By indicating to system 104 that such recorded sounds are indications of distress, system 104 can compare the stored sounds of distress to sounds captured later in time by microphone 122 and make a determination as to whether or not pet 100 is in distress.

Figure 6:
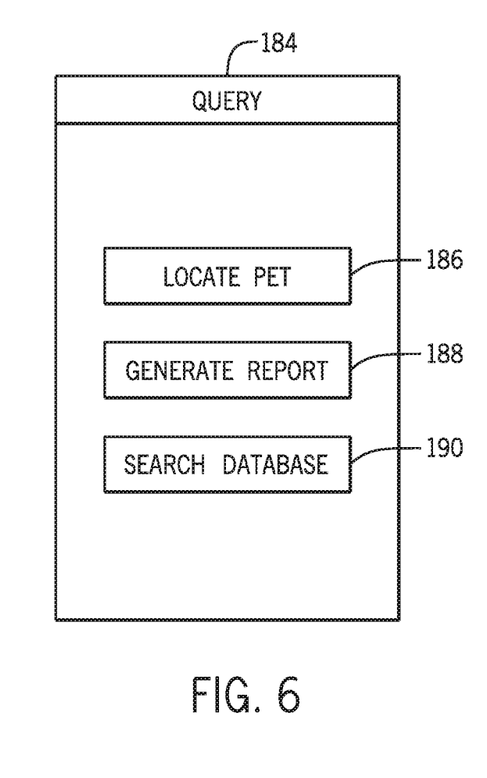
FIG. 6 is a screen layout of an exemplary user interface screen showing query options available to the user of the exemplary main interface screen of FIG. 5.

FIG. 6 is an interface screen 184 that is presented on device 160 when a pet owner selects query option 174. Screen 184 presents queries that a user can execute on system 104 to retrieve data stored in database 136. For example, selection of locate my pet 186 by the pet owner causes system 104 to look up in database 136 the last location recorded in which system 104 detected RFID tag 108. Selection of generate report 188 causes 104 to generate a report based on entries stored in database 136, such as which RFID tags 108 were detected and for how long. For example, a status report can indicate that pet 100 left bed 110 to go to water bowl 112 three times over the course of a period of time, only to return to bed 110 and not going outside through pet door 116. Likewise, a status report can indicate that pet 100 was near front door 114 at 1 PM, which would indicate to the pet user that an expected visit from someone, such as a package delivery service or child returning home from school, has been detected. For specific information, selecting the option of search database 190 engages a database management system that allows the user to search database 136 for specific information stored therein.

Figure 7:
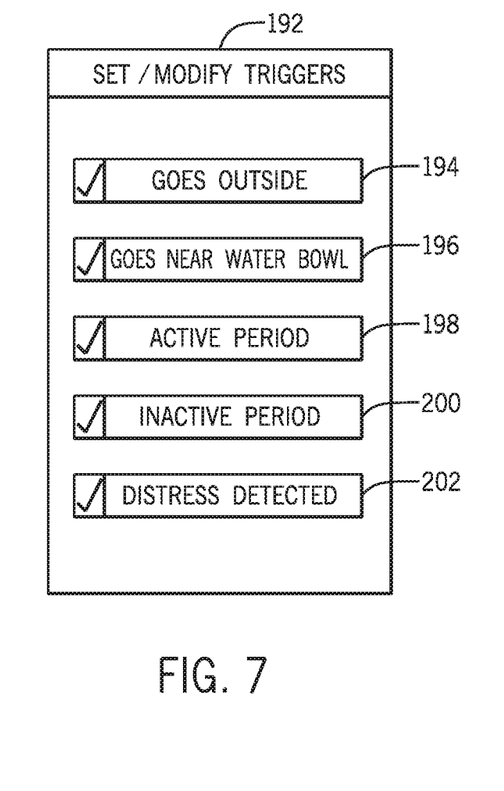
FIG. 7 is a screen layout of an exemplary user interface screen showing various trigger conditions that are available to the user of the exemplary main interface screen of FIG. 5.

Directing attention to FIG. 7, selection of set/modify triggers option 178 results in screen 192 being displayed to the pet owner on device 160. Screen 192 is a configuration interface that allows the pet owner to customize the generation of messages sent by system 104 to device 160. Examples include multiple inputs that can be selected either by a check mark or by a number of occurrences of a specific event. For example goes outside option 194 allows a user to be alerted if pet 100 goes outside once, or a set number of times. Goes near water bowl option 196 provides a similar input for pet 100 approaching water bowl 112 (once or for a number of occurrences). Active period observed option 198 can be selected to trigger user notification if pet 100 is active for a configurable period of time. Inactive period observed option 200 can be selected to trigger user notification if pet 100 is inactive for a configurable period of time. Distress detected option 202 can be selected to notify the user if pet 100 has exhibited signs of distress. For example, observable behavior such as barking, making sounds while sedentary and the like can indicate distress. If pet 100 is located in pet bed 110, and is inactive but whining may indicate that pet 100 is in pain from illness or injury.

Figure 8:
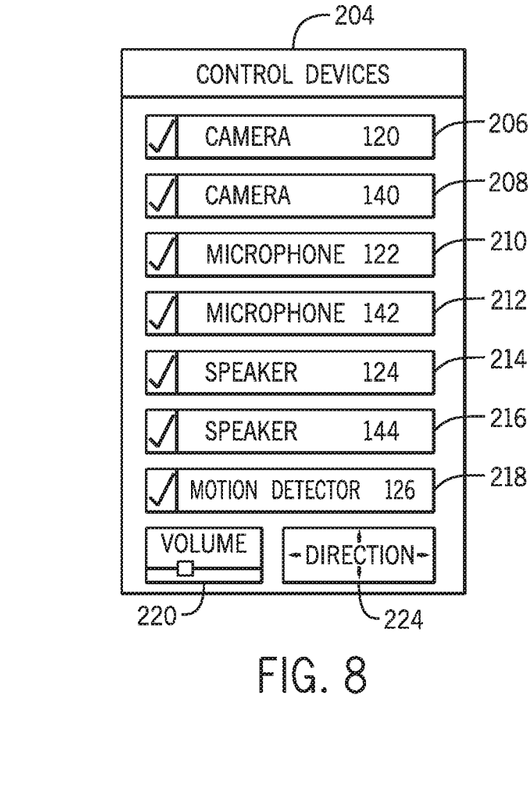
FIG. 8 is a screen layout of an exemplary user interface screen showing various options available to the user of the exemplary main interface screen of FIG. 5 for controlling devices located in the pet's environment and the monitoring system located on the pet's collar.

Directing attention to FIG. 8, remote control of devices in environment 106 and on system 104 is a useful feature of system 104. In some embodiments, where system 104 incorporates devices such as camera 140, microphone 142, speaker 144 and the like, activating these devices as well as other devices in environment 106, such as camera 120, microphone 122, speaker 124 or motion detector 126. Selection of control devices option 180 displays interface 204 on device 160. Interface 204 allows the pet owner to select individual devices for remote control, such as activating camera 120 (option 206) or camera 140 (option 208), microphone 122 (option 210) or microphone 142 (option 212), speaker 124 (option 214) or 144 (option 216), and motion detectors 126 (option 218). Additional controls are included in embodiments, such as volume option 220, for controlling speaker volume, or direction option 224 for manipulating camera 120 or 140.

Figure 9:
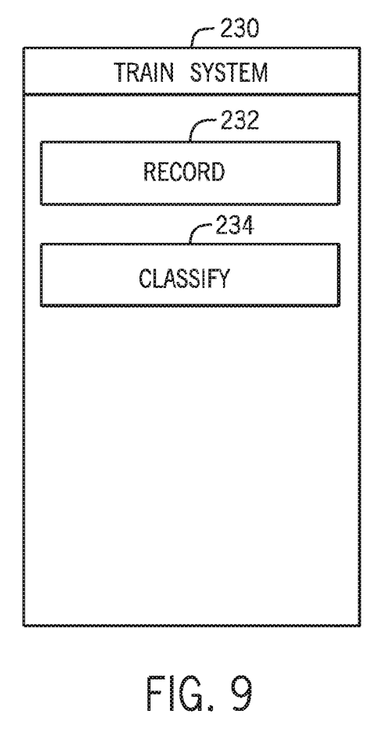
FIG. 9 is a screen layout of an exemplary user interface screen showing the record and classify options available to the user of the exemplary main interface screen of FIG. 5 for training the system located in the pet's collar shown in FIGS. 3A and 3B.

Directing attention to FIG. 9, is an exemplary interface 230 that executes on a user's device and gathers training information regarding the user's pet during a configuration period to provide accurate notifications while a pet is monitored through system 104 detecting the various RFIDs 108 and gathering inputs from cameras 120, microphones 122, and motion detectors 126. For example, when pet 100 is agitated and barking loudly, for example an alarm bark, the user can activate training screen 230, and from screen 230 activate microphone 122 or microphone 142 to record the alarm bark and store it for comparison in database 136. In an embodiment, record option 232 allows the user to turn on and off microphone 122 or microphone 142 to capture a specific sound that the pet owner wants to classify as indicating a specific condition, such as distress, as exhibited by intense, prolonged barking, or by whining. Once the sound is captured through the selection of record option 232, selecting the classify option 234 allows the user to generate a tag that is stored with the recording in database 136, which generates a control sample to which behaviors observed by system 104 are compared. By training system 104 to compare observed inputs with stored control sample, system 104 incorporates intelligence that is useful in generating notifications sent to the user of device 160.

Figure 10:
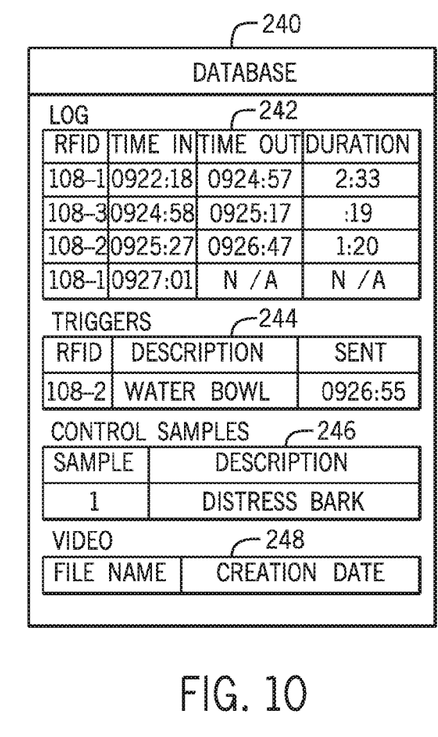
FIG. 10 is data table showing an exemplary format for recording and storing data records on the removable storage medium a database containing pet activity log, triggers selected by a user from the interface screen shown in FIG. 7, and control samples obtained from training the system using the interface shown in FIG. 9.

Directing attention to FIG. 10, an exemplary layout 240 of database 136 is shown. In an embodiment, database 136 contains log 242 showing times and durations for pet 100 being near various RFID tags 108 located in environment 106. As shown, pet 100 is detected near RFID tag 108-1 at 9:22:18, which is associated with pet bed 110. Detection of RFID tag 108-1 continues until 9:24:51, a duration of two minutes and 33 seconds. No RFID tags are detected until 9:24:58, seven seconds later, when RFID tag 108-3, associated with front door 114, is detected. Detection of RFID tag 108-3 lasts for 19 seconds, and then no additional detection occurs for another ten seconds, at which time RFID tag 108-2 is detected, which is associated with water bowl 112. Detection of RFID tag 108-2 lasts for one minute and 20 seconds, indicating that pet 100 is near water bowl 112 for an amount of time that could indicate pet 100 is drinking water. At 9:27:01, RFID tag 108-4 is detected, and there is no time out entry listed, indicating that pet 100 has returned to bed 110 and is there at the time database 136 is viewed by the user. Returning to FIG. 6, selection of locate pet option 186 causes processor 130 to search database 136 until it finds the last entry in the log 242, characterized by a lack of entries for time out and duration. Selection of generate report option 188 causes log 242 to be shown on display 172. Selection of search database option 190 allows a user to search for a specific time of day, or by specific RFID tag detection instance. Returning to FIG. 7, triggers set by use of screen 192 are shown below log 242 in triggers section 244. As shown, because goes near water bowl 112 was selected as a trigger in FIG. 7, triggers section 244 contains an entry for when the log entry for RFID-2 showed a duration of 1:20, a notification was sent to device 160 across network 158 eight seconds after detection of RFID-2 was lost, informing the user that pet 100 was near water bowl 112. In an embodiment, the duration of time spent near water bowl 112 is also provided in the user notification.

Below triggers section 244, control samples section 246 shows one entry, having the description of distress bark. This is the result of selecting train system option 230 shown in FIG. 9, where the pet owner recorded pet 100 barking in what the pet owner recognized as a bark that pet 100 makes when distressed. When comparisons of observed inputs are made, they are made against the samples stored in control samples section 246.

Below control samples section 246 is video files section 248, which contains stored video segments recorded by camera 140. As explained above, database 136 is stored on removable storage medium 152, so that a veterinarian or pet owner can review the contents of database 136 on another device such as a computer or smart phone. However, in some embodiments, the contents of database 136 are readable by processor 130 on system 104, which can then relay the contents by transmitter 132 to communications network 158 and ultimately to a remote user of device 160.

Figure 11:
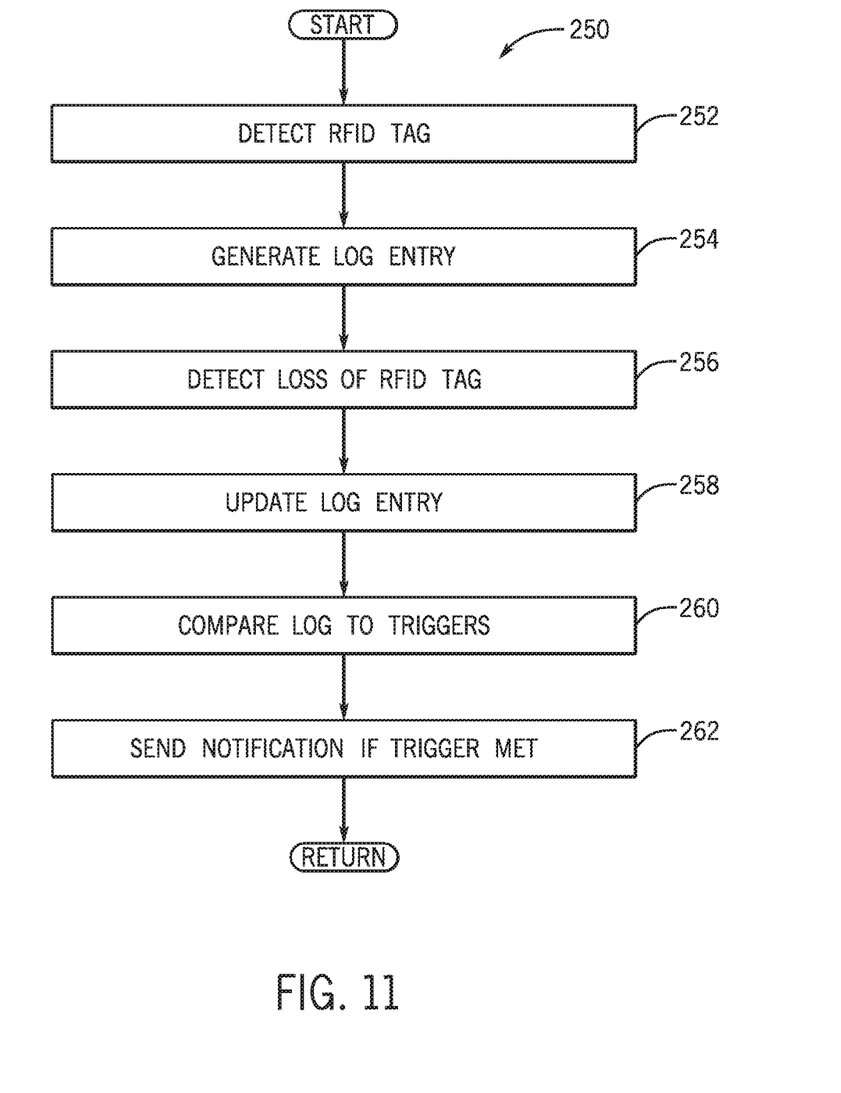
FIG. 11 is a flow chart showing an operative sequence of steps for detecting RFID tags and updating the database in the format shown in FIG. 10.

FIG. 11 is a flow chart of a sequence of operative steps 250 executed to monitor a pet's activities and issue notifications to a pet owner or other user. At step 252, system 104 detects a signal reflected from RFID tag 108. At step 254, processor 130 then creates a database entry in database 136 that includes the time at which receiver 134 received a signal reflected by RFID tag 108. At step 256, the RFID tag detected at step 252 is determined to be no longer reflecting a signal emitted by transmitter 132. At step 258, the log entry created at step 254 is updated to indicate when loss of the reflected signal from RFID tag 108 occurred and the duration for which the signal was received before it was lost. Typically, pet 100 will move from RFID tag 108 to another, so that a handoff of signal is achieved when receiver 134 loses a reflected signal from RFID tag 108 but soon detects a different RFID tag 108, such as when pet 100 is moving around between areas within environment 106. In this manner, a tracking function is performed in that the pet's 100 movements are observed and recorded and log 242. At step 260, the log entry created at steps 254 and 258 is compared against entries stored in trigger section 244. Based on triggers set by the pet owner in screen 192, various notifications can be formed at step 204. Different RFID tags 108 can have different, distinguishing labels associated with them within database 136, such as "bed," "water bowl" "front door," "pet door," "kitchen," "back yard," etc., to quickly inform a user as to the location of pet 100 at different times within the status report period. The process of monitoring pet 104's location and recording them in database entries over time allows generation of a report that reflects pet 104's movements within environment 106. Characteristics of pet 104's behavior can be identified and provided in notifications at step 262 to a user over network 158. These notifications can either be pushed by processor 130 to a user based on triggers or simply by scheduled reports, or retrieved on demand by the user from database 136.

Figure 12:
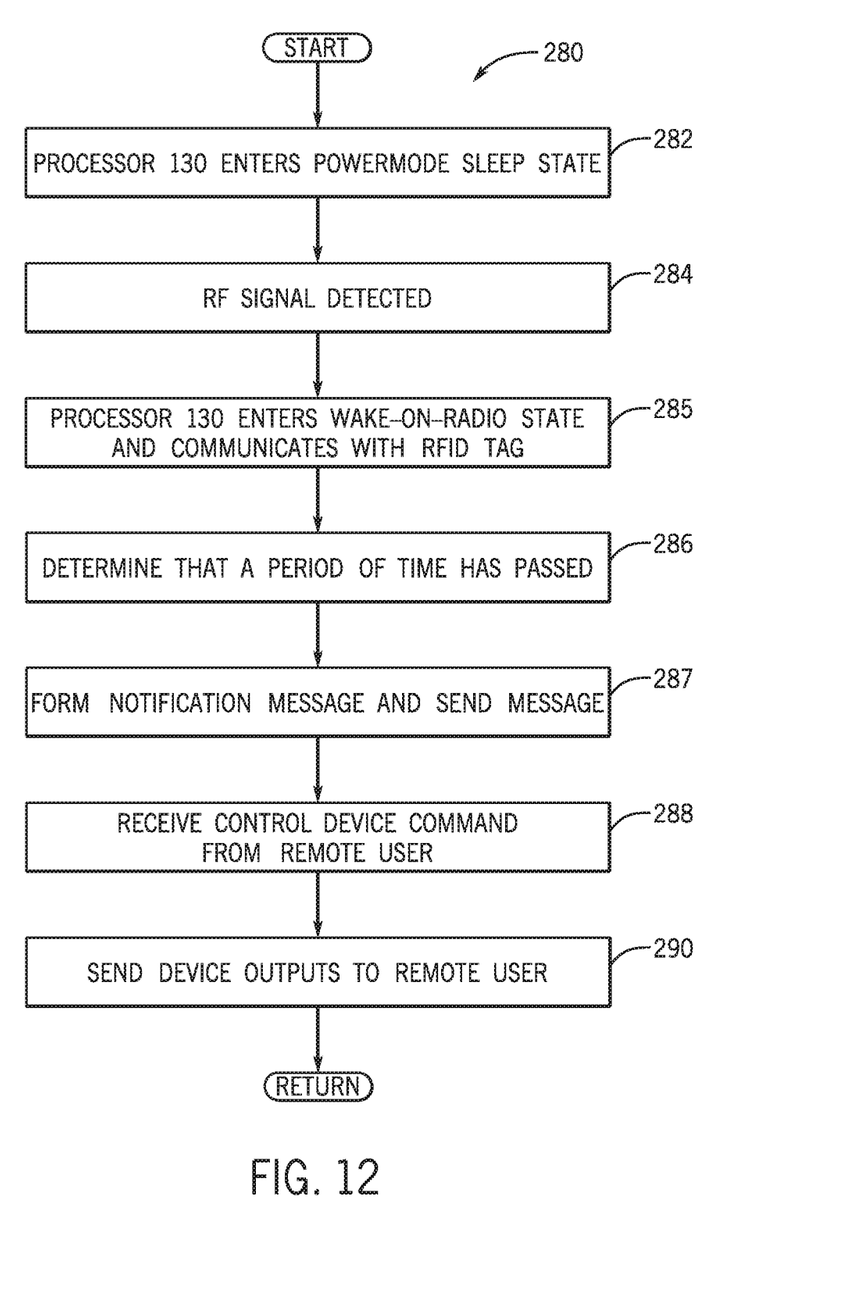
FIG. 12 is a flow chart showing an operative sequence of steps for detecting that no RFID tags are reflecting signals from the system attached to the pet collar and allowing a remote user to control devices in the environment shown in FIG. 2.

FIG. 12 is a flow chart of a sequence 280 of operative steps executed to determine whether or not a pet is in distress and to send a notification to a remotely-located user regarding a distressed pet. Under normal operation, pet 100 should interact with RFID tags 108 placed throughout environment 106. RFID tags 108 activate based on close proximity to transmitter 132, so RFID tags 108 are placed where pet 100 is anticipated as being near, for example water bowl 112, bed 110, etc. But placing RFID tag 108-4 near pet door 116 can provide useful information that indicates that pet 100 is experiencing digestive or urinary problems due to frequency of passing through pet door 116 or spending more time than usual near water bowl 112 and RFID tag 108-2. Likewise, if pet 100 is not leaving bed 110 and RFID tag 108-1 continues to register for extended periods of time, these conditions may indicate a sick or injured pet. Similarly, while pet 100 can move around freely while its movements are recorded by system 104 upon detection of its signals reflected by the various RFID tags 108 and received by receiver 134, it is the absence of a reflected signal over time that triggers a notification to a user in an embodiment. This could indicate pet 100 is lying down out of range of an RFID tag 108, for example, when due to illness or injury pet 100 is uncharacteristically inactive. At step 282, processor 130 enters a powermode sleep state in which battery power is conserved. In normal operation during this sleep state, transmitter 132 periodically broadcasts an RF signal at a frequency that RFID tags 108 are designed to reflect. When an RF signal is detected by receiver 134 (step 284), processor 130 enters a wake-on-radio state (step 285) and communicates with the RFID tag 108 from which a signal was received. As long as at least one of RFID tags 108 is detected by receiver 134 during a broadcast period, conditions are considered normal as pet 104 is located and recognized by system 104 as being near one of RFID tags 108. As not every configuration will have complete coverage by placement of RFID tags 108, and blind spots may be present in an area in which RFID tags 108 are deployed, and there may be situations where pet 100 moves temporarily into a blind spot. At step 286, a period of time passes where a reflected signal from any RFID tag 108 is not received. At step 287, a notification is formed by processor 130 as a text or email message and sent over network 158 to a remotely-located user carrying computing device 160. In an optional step 288, system 104 receives a control devices command from the user, and the user may activate cameras 120 or 140, microphones 122 or 142, speakers 124 or 144, or motion sensors 126 located throughout environment 106, such as inside a home or in a backyard or patio, and under the control of processor 130. At step 290, outputs from these devices are sent by communication module 146 over network 158 to remote device 160 (FIG. 4). By activating cameras 120 or 140, a user can visually verify the presence or absence of pet 100. Similarly, by activating microphone 122 and speaker 124, and using voice, the user can call the name of pet 100 over speaker 124 and then listen for a sound made by pet 100 and picked up by microphone 122. If camera 140 doesn't convey the visual image of pet 100 and microphone 124 doesn't pick up any sounds made by pet 100, this may be an indication that pet 100 has escaped and is running loose.

Figure 13:
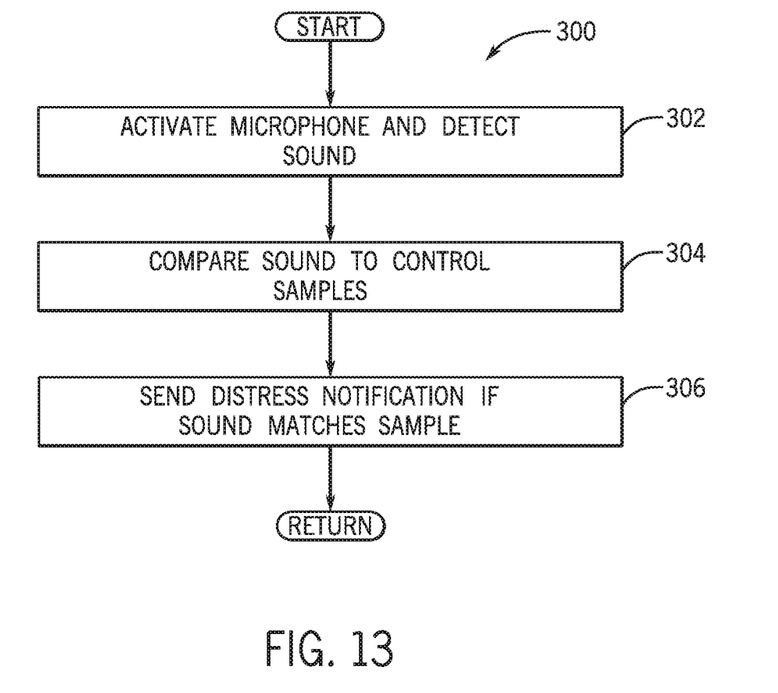
FIG. 13 is a flow chart of an operative sequence of steps executed by the system shown in FIG. 2 to compare inputs received from devices in the pet environment shown in FIG. 2 as well as on the pet collar to identify a distress condition and send notifications to a user device connected to the network.

FIG. 13 is a flow chart of a sequence of operative steps 300 executed to determine a pet's level of distress. At step 302, using input from microphone 122 or 142 during a monitoring period, processor 130 can detect sounds made by pet 100. For example, an extended period of intense barking can indicate the presence of an intruder. Based on individual configuration, such as by training processor 130 as to what constitutes an "alarm bark" made by a dog, as opposed to a boredom bark from the dog, processor 130 can compare microphone inputs at step 304 to control samples stored in database 136 at section 246 (FIG. 9) to trigger a notification being sent to the user when an alarm bark is detected, while ignoring boredom barks which do not match the control sample stored in section 246. Similarly, the time a notification is received can be informative to a user. For example, if pet 100 barks loudly and intensely when a postal carrier drops mail into a mailbox, or a deliver service rings a doorbell, causing pet 100 to react, a notification received at a certain time of day that pet 100 is making noise can serve as confirmation that another event has occurred, such as mail has been delivered or a package has been left on a doorstep. When such events occur, at step 306, a distress notification is formed by processor 130 and sent to the user over network 158. A period where processor 130 doesn't detect any RFID tags 108 may indicate a distress condition for pet 100. In such a case, processor 130 may activate devices such as cameras 120 and 140, microphones 122 and 142, and motion sensors 126 at step 308. Inputs received from these activated devices are analyzed at step 310. Processor 130 analyzes camera, inputs to determine movement within a camera view, simply by comparing images received from cameras 120 and 140. If images from camera inputs are not changing, this may indicate that pet 100 is not moving, as a pet in motion within a camera view would result in a change in image over time. Image comparison is a relatively simple comparison, where pixel values are compared individually from a single camera view from a first time to the same camera view at a later time. If the image changes, so do the pixel values associated with the later-in-time image. This analysis can be performed on all cameras in environment 106, including camera 140 on system 104. Similarly, if cameras 120 and 140 are not showing changing images, inputs from microphones 122 and 142 can be examined for detected sounds. For example, a whining sound from pet 100 picked up on mic 142 can indicate that pet 100 is in distress. Inputs from microphones 122 in environment 106 may also indicate a reason for pet 100 remaining out of view of cameras 120 and 140, for example of loud noises from a thunderstorm or other source frighten pet 100 and cause it to hide somewhere out of view and away from RFID tags 108. If pet 100 is hiding under a bed or behind between a wall and a sofa for example, camera 140 on collar 102 may simply show a black screen as there is not enough light to capture any meaningful images, and pet 100 might remain hidden until it feels danger has passed and it comes out of hiding. Once analysis is complete, depending on inputs identified as changing, system 104 sends a distress notification to the user at step 306.

While a system and method for performing remote monitoring of a pet have been described and illustrated in detail in the preferred embodiment, it is to be understood that numerous modifications can be made to the present invention without departing from the spirit and scope as set forth in the following claims.

What is claimed is:

1. A pet monitoring device wearable by a pet for recording and communicating the pet's movements within an environment in which radio frequency identifier (RFID) tags are placed, the pet monitoring device comprising:
   a transmitter configured to send a radio signal to an area surrounding a pet's location;
   a receiver configured to receive a reflected radio signal from an RFID tag within the area;
   a processor configured to identify the RFID tag of the reflected radio signal; and
   a database in which the processor stores times and locations of identified RFID tags in the environment such that the times and locations are indicative of behavior of the pet in the environment.

2. The pet monitoring device of claim 1, wherein the processor is configured to enter a powermode sleep state.

3. The pet monitoring device of claim 1, further comprising:
   a removable storage medium in which the database can be stored.

4. The pet monitoring device of claim 3, wherein:
   the removable storage medium is contained inside the pet monitoring device behind an access door.

5. The pet monitoring device of claim 1, further comprising:
   a camera, and wherein the database is configured to store images captured by the camera.

6. The pet monitoring device of claim 1, further comprising:
   a microphone, and wherein the database is configured to store audio captured by the microphone.

7. The pet monitoring device of claim 6, wherein:
   the audio captured by the microphone is determined by the processor to be indicative of a pet in distress by comparing the captured audio to control samples stored in the database.

8. The pet monitoring device of claim 6, wherein:
   the audio captured by the microphone is determined by the processor to be a distress bark.

9. The pet monitoring device of claim 1, further comprising:
   a communication link configured to transmit portions of information stored in the database over a communication network to a remotely-located user.

10. The pet monitoring device of claim 9, wherein:
    the processor is configured to operate the communication link upon detection of a trigger condition.

11. The pet monitoring device of claim 9, further comprising:
    a speaker, wherein the processor is configured to controllably transmit sounds via the speaker.

12. The pet monitoring device of claim 11, wherein:
    the sounds transmitted via the speaker include sound files received over the communication link from the communication network.

13. The pet monitoring device of claim 1, wherein:
    the identified RFID tags are associated with locations within the environment.

14. The pet monitoring device of claim 13, wherein:
    the locations within the environment include a location in which a pet typically drinks water.

15. The pet monitoring device of claim 13, wherein:
the locations within the environment include a location in which a pet typically rests.

16. The pet monitoring device of claim 13, wherein:
the locations within the environment include a location where there is a one of either a door or a window.

17. A method of monitoring a pet from a remote location, the method comprising:
placing a pet monitoring device on a pet collar, the device being configured to detect individual radio frequency identifier (RFID) tags in an environment in which a plurality of RFID tags have been placed;
generating a log entry when an RFID tag is detected, and updating the log entry when the RFID tag is no longer detected;
comparing the log entry to at least one trigger condition; and
sending a notification over a communication network to a remote user if the trigger condition is met.

18. The method of claim 17, further comprising:
periodically transmitting a radio signal that is capable of reflection by an RFID tag in the environment, and sending a message over the communication network that no RFID tags have been detected for a period of time.

19. The method of claim 17, further comprising:
including a microphone in the pet monitoring device;
recording a control sample audio file captured by the microphone onto a storage medium in the pet monitoring device;
associating a trigger condition with the recorded control sample audio file;
capturing a subsequent audio file with the microphone;
comparing the subsequent audio file with the control sample audio file; and
sending a distress notification if the subsequent audio file is sufficiently similar to the control sample audio file.

20. The method of claim 17, further comprising:
activating at least one of the group of devices consisting of a camera, a microphone, and a motion detector, and capturing input from the activated device;
comparing input from the activated device to a control sample; and
sending an additional distress notification to a remote user over a communication network.

* * * * *